R. A. WEAGANT.
APPARATUS FOR PREVENTING STATIC INTERFERENCE IN RADIOSIGNALING.
APPLICATION FILED DEC. 12, 1917.

1,353,002.

Patented Sept. 14, 1920.

INVENTOR
Roy Alexander Weagant

BY
Sheffield & Betts
his ATTORNEYS.

UNITED STATES PATENT OFFICE.

ROY A. WEAGANT, OF NEW YORK, N. Y., ASSIGNOR, BY MESNE ASSIGNMENTS, TO RADIO CORPORATION OF AMERICA, A CORPORATION OF DELAWARE.

APPARATUS FOR PREVENTING STATIC INTERFERENCE IN RADIOSIGNALING.

1,353,002.  Specification of Letters Patent.  Patented Sept. 14, 1920.

Application filed December 12, 1917. Serial No. 206,724.

*To all whom it may concern:*

Be it known that I, ROY ALEXANDER WEAGANT, a citizen of the United States, residing at Douglas Manor, in the county of Queens, city and State of New York, have invented or discovered certain new and useful Improvements in Apparatus for Preventing Static Interference in Radiosignaling, of which the following is a specification.

My invention relates to the art of radio signaling, and has for its principal object the provision of improved receiving apparatus for reducing or preventing static interference. In its preferred embodiment my invention is an improvement over the apparatus in my pending application Serial No. 181,458, filed July 19, 1917. In said application I call attention to the fact that whereas signal waves travel in a horizontal direction, and therefore affect successively the two parts of a divided antenna or collector disposed in the line of propagation of such waves, static waves affect the two parts of such an antenna simultaneously, and appear to be propagated in a vertical direction only, and I describe in said application means for making practical use of these observations for reducing or eliminating the effect of such static disturbances. My present invention is based on the further observation that the force or effect of static disturbance is very greatly diminished beneath the surface of the earth, whereas horizontally traveling signal waves, such as are now commercially used in radio signaling penetrate a substantial distance below the surface of the earth with small diminution in strength. In order to make practical use of these observations I place the receiver of my improved system, including the antenna or collector— the latter being preferably made as described in my said application—beneath the surface of the ground, and to further protect it from atmospheric disturbances, I cover the surface of the ground above the receiver with a metallic screen, as hereinafter described.

Figure 2:
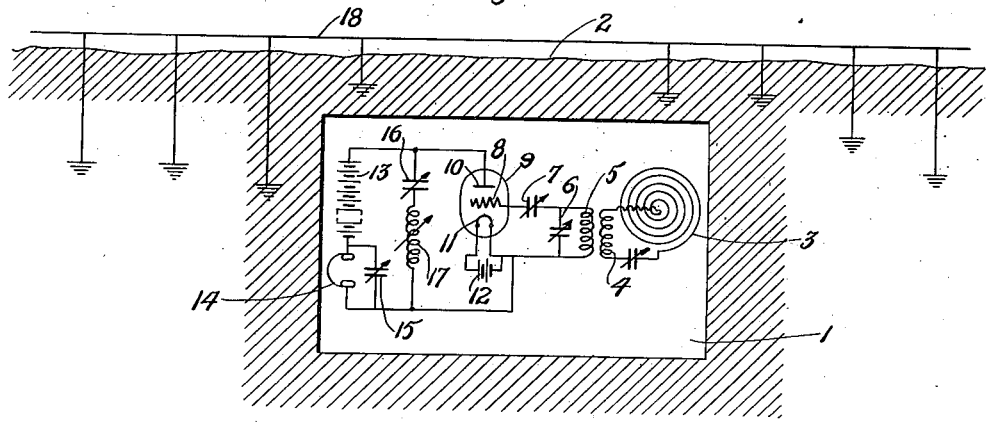
Figure 1:
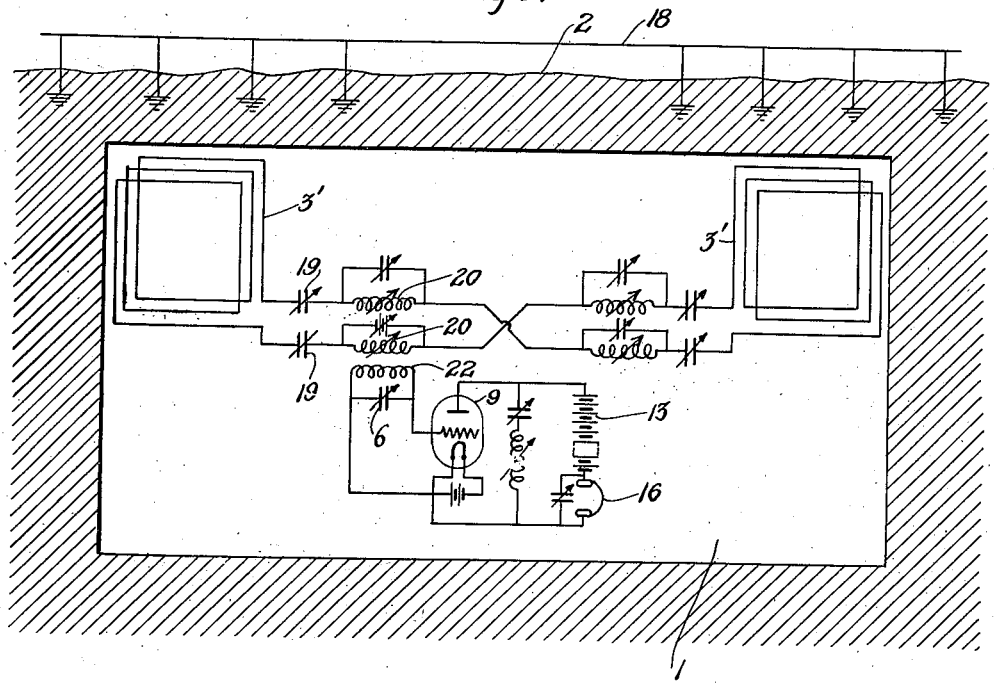

In the drawing accompanying and forming a part of this specification Figure 1 is a diagrammatic view of a receiving station embodying the preferred form of my invention, a divided collector of the general type described in my said application being shown associated with receiving and detecting apparatus. Fig. 2 of the drawing is a diagrammatic view of a modified receiver in which a single collector is employed.

Referring in detail to the preferred form of apparatus shown in Fig. 1, 1 is a chamber beneath the surface 2 of the ground. Within this chamber there is disposed a divided collector having two coils 3' 3' disposed in a single vertical plane in the line of the signal waves to be received. The ends of the coils 3' are crossed and conductively connected so that a horizontally-extending portion of one collector opposes a similarly placed horizontal portion of the other collector. In the leads from each collector are variable capacities 19 and variable inductances 20, one of the inductance coils serving as the primary of a coupling transformer, the secondary of which is connected in the circuit of a detector or receiver of any approved type—that shown being a receiver of the vacuum valve type, comprising a vacuum valve 9 and an energizing battery 13. As this receiver and its mode of operation are now well known, it will not be described in detail.

A metallic conducting screen 18 is disposed on the surface of the ground above the receiving apparatus just described, and this screen is preferably grounded at a large number of points. In practice this screen may take the form of a net work of wires resting directly on the ground or a metallic screen of any kind supported immediately above the ground, as shown in the drawing.

Referring now to the modified apparatus shown in Fig. 2, this is in general the same as that shown in Fig. 1, except that the collector consists of a single coil 3 vertically disposed in the line of the signal waves to be received, instead of a plurality of coils as shown in Fig. 1. The ends of the coil 3 in this modified arrangement are connected to the oscillation transformer 4, the secondary of which is connected to the vacuum valve of receiver 9, which is shown to be of the same type referred to in connection with Fig. 1. The arrangement shown in Fig. 2 likewise comprises a screen 18 disposed along the surface of the ground.

From the foregoing it will be apparent that the effects of atmospheric disturbances in both arrangements will be greatly reduced by reason of the fact that the collectors are beneath the surface of the ground, and from the fact that the apparatus is protected by a conducting screen against disturbances propagated in vertical directions. In addition the arrangement shown in Fig. 1, embodying, as it does, the principle of my earlier application, still further eliminates the effect of static disturbances by the use of the divided collectors. By reason of this arrangement static disturbances which succeed in penetrating the earth are in effect balanced out or canceled. That is to say, impulses set up in the collectors 3' simultaneously, as by static disturbances, are made to oppose each other, whereas oscillations set up by signal waves being out of phase, act cumulatively on the detector 9.

While I have shown the collectors inclosed in a chamber beneath the surface of the ground, I have demonstrated that these collectors may be buried in the ground, and that successful operation may be had when they are so buried, even though the wires forming the collectors are not covered by insulation.

Having now described my invention what I claim is:

1. A receiving station for radio signals, comprising a collector disposed beneath the surface of the ground, in combination with a conducting screen disposed at the surface of the ground over the collector.

2. A receiving station for radio signals, all portions of which are beneath the surface of the ground, in combination with a conducting screen disposed at the surface of the ground over the station.

3. A receiving station for radio signals, comprising a looped collector disposed beneath the surface of the ground, in combination with a conducting screen disposed at the surface of the ground over the looped collector.

4. A receiving apparatus for wireless signals, comprising in combination, a pair of collectors lying beneath the surface of the ground in substantial alinement in the direction of desired reception, a detector circuit associated with said collectors, and means common to both said collectors for differentially affecting the detector circuit by static impulses received in said collectors.

ROY A. WEAGANT.